US012719745B2

(12) United States Patent
Agrawal et al.

(10) Patent No.: US 12,719,745 B2
(45) Date of Patent: Aug. 25, 2026

(54) AUTOMATIC UPDATING OF ELECTRONIC DEVICE FEATURES AND SOFTWARE IN PREPARATION FOR A PLANNED OR DETECTED TRAVEL TO A DIFFERENT GEOGRAPHICAL LOCATION OR COUNTRY

(71) Applicant: MOTOROLA MOBILITY LLC, Wilmington, DE (US)

(72) Inventors: Amit Kumar Agrawal, Bangalore (IN); Sachin Kumar Balera, Hosapalya (IN); Srikanth Raju, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 300 days.

(21) Appl. No.: 18/542,419

(22) Filed: Dec. 15, 2023

(65) Prior Publication Data

US 2025/0202766 A1 Jun. 19, 2025

(51) Int. Cl.
*H04L 41/0813* (2022.01)
*H04L 41/0823* (2022.01)
*H04L 67/52* (2022.01)

(52) U.S. Cl.
CPC ...... *H04L 41/0813* (2013.01); *H04L 41/0823* (2013.01); *H04L 67/52* (2022.05)

(58) Field of Classification Search
USPC .......................................................... 709/221
See application file for complete search history.

(56) References Cited

U.S. PATENT DOCUMENTS 9,386,042 B1 * 7/2016 Stoner ................... H04L 63/107
2014/0059188 A1 * 2/2014 Linden ................ H04L 41/0813 709/220
2014/0171116 A1 * 6/2014 LaMarca ........... H04M 1/72403 455/456.3
2016/0330626 A1 * 11/2016 Barillaud ................ H04W 4/50
2018/0108003 A1 * 4/2018 Todasco ............. G06Q 20/3224
2020/0380426 A1 * 12/2020 Schlank ............... G06Q 50/265

* cited by examiner

*Primary Examiner* — Atta Khan
(74) *Attorney, Agent, or Firm* — Isidore PLLC

(57) ABSTRACT

An electronic device, computer program product, and method autonomously updates/modifies device features and/or settings for use in a new location having specific requirements for device usage. The device processor executes code to: determine that a user of the electronic device will be travelling from a first location having the first set of location specific requirements to a second location having a second set of location specific requirements; and identify the second set of location specific requirements corresponding to the second location. In response to at least one of a time trigger or a location trigger corresponding to the electronic device being moved to the second location, the processor autonomously modifies one or more device features associated with the second set of location specific requirements to enable the electronic device to operate according to the second set of location specific requirements while the electronic device is in the second location.

19 Claims, 13 Drawing Sheets

FIG. 2A
100
205
Greenland
215
Europe
Asia
210
North
225
merica
Africa
South
America
Australia
Antarctica

AUTOMATIC UPDATING OF ELECTRONIC DEVICE FEATURES AND SOFTWARE IN PREPARATION FOR A PLANNED OR DETECTED TRAVEL TO A DIFFERENT GEOGRAPHICAL LOCATION OR COUNTRY

BACKGROUND

1. Technical Field

The present disclosure relates generally to user-portable electronic devices and in particular to electronic devices that are configurable to support location specific requirements.

2. Description of the Related Art

User-portable electronic devices, such as cell phones, tablets, and laptops, are widely used by users who take along their devices when the user travels from one location to another location, such as from one country to another. These electronic devices are often equipped with hardware and software features that the users frequently use while they are at their home locations. However, differences in regulations in different locations (e.g., from one country to another) can cause some of the hardware and software features in the electronic devices to be non-operable or even illegal to operate. As such, it can be a frustrating experience when a user is not able to fully use the user's electronic device when the user travels to a second location without being aware that the device features may not work or are not legal to operate in the second location.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
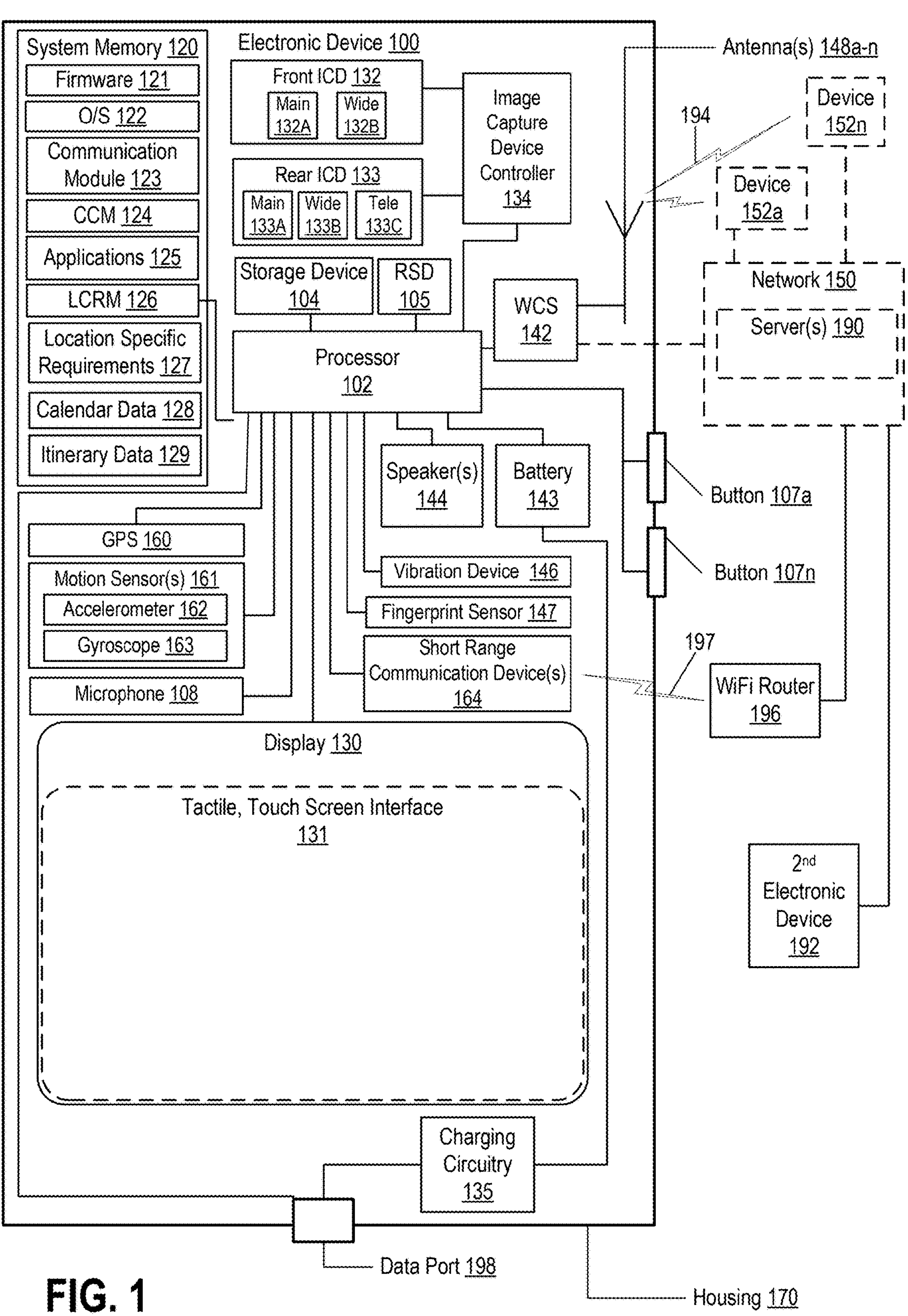
FIG. 1 depicts an example electronic device within which various aspects of the disclosure can be implemented, according to one or more embodiments.

The present disclosure provides an electronic device, a method, and a computer program product that enables autonomous configuring of device features of an electronic device so that a user can use the device features when travelling from one geographic location to another geographic location having different device requirements. According to one or more embodiments, the electronic device includes a memory having stored thereon a location-based computing requirement management (LCRM) module for managing computing requirements and/or settings (generally "computing requirements") of the electronic device in different geographic locations. The computing requirements includes a first set of location specific requirements and at least one second set of location specific requirements that are different from the first set. The electronic device also includes at least one processor communicatively coupled to the memory. The at least one processor executes program code of the contact management and sharing module to cause the processor to: (i) determine that a user of the electronic device will be travelling from a first location having the first set of location specific requirements to a second location having a second set of location specific requirements; (ii) identify the second set of location specific requirements corresponding to the second location; and (iii) in response to at least one of a first time trigger or a first location trigger corresponding to the electronic device being moved to the second location, autonomously modify one or more device features or corresponding to the second set of location specific requirements to enable the electronic device to operate according to the second set of location specific requirements while the electronic device is in the second location.

According to one or more embodiments, the method provides computer-implemented processes for configuring device features of an electronic device so that a user can use the full set of allowed/permitted device features when travelling from one geographic location to another geographic location. The method includes determining that a user of an electronic device will be travelling from a first location having a first set of location specific requirements for operating the electronic device to a second location having a second set of location specific requirements that are different from the first set. The method includes identifying the second set of location specific requirements corresponding to the second location. The method also includes, in response to at least one of a first time trigger or a first location trigger corresponding to the electronic device being moved to the second location, autonomously modifying one or more device features corresponding to the second set of location specific requirements to enable the electronic device to operate according to the second set of location specific requirements while the electronic device is in the second location.

According to one or more embodiments, the disclosure may include a computer program product that includes a computer readable storage device and program code on the computer readable storage device that when executed by a processor associated with an electronic device, the program code enables the communication device to provide functionality of the above-described method processes.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. Electronic device 100 includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing, and transmitting of data and information. The ICD controller 134 may perform or support functions such as, but not limited to, selecting and activating an active camera from among multiple cameras. Throughout the disclosure, the term image capturing device is utilized interchangeably to be synonymous with and/or refer to any one of front or rear facing cameras 132, 133.

System memory 120 may be a combination of volatile and non-volatile memory, such as random-access memory (RAM) and read-only memory (ROM). System memory 120 can store program code or similar data associated with firmware 121, an operating system 122, communication module 123, camera control module (CCM) 124, applications 125, and location-based computing requirement management (LCRM) module 126. Communication module 123 includes program code that is executed by processor 102 to enable electronic device 100 to communicate with other external devices and systems.

Although depicted as being separate from applications 125, CCM 124, LCRM 126, and communication module 123 may be each implemented as an application. Processor 102 loads and executes program code stored in system memory 120. Examples of program code that may be loaded and executed by processor 102 include program code associated with communication module 123 and applications 125 and program code associated with LCRM 126. Execution of the code associated with LCRM 126 causes the processor to access location specific requirements 127, which are stored requirements related to different locations that the user can travel to. The location-specific requirements 127 can be used to identify, for example, applications, websites and/or content that are approved, banned and/or restricted for each identified location. Execution of the code associated with location-based computing requirement management module 126 can also cause the processor to access calendar data 128 and itinerary data 129 to determine a date that the user will travel and a location that the user will travel to.

According to one or more embodiments, electronic device includes removable storage device (RSD) 105, which is inserted into an RSD interface (not shown) that is communicatively coupled via system interlink to processor 102. According to one or more embodiments, RSD 105 is a computer readable storage device encoded with program code and corresponding data, and RSD 105 can be interchangeably referred to as a non-transitory computer program product or non-transitory computer readable storage device having non-transitory computer readable program code/instructions. RSD 105 may have a version of LCRM 126 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is wide angle camera that captures a wide angle FOV. Front facing cameras 132A and 132B can be collectively referred to as front facing cameras 132A-132B or front facing camera(s) 132. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B, and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C or rear facing cameras 133. While three rear facing cameras are shown, electronic device 100 can have less than three rear facing cameras, such as having only one or two rear facing cameras, or can have more than three rear facing cameras.

Electronic device 100 can further include data port 198, charging circuitry 135, and battery 143. Electronic device 100 further includes microphone 108, one or more output devices such as speakers 144, and one or more input buttons 107*a*-107*n*. Input buttons 107*a*-107*n* may provide controls for volume, power, and image capture device 132. Microphone 108 can also be referred to as audio input device 108. Microphone 108 and input buttons 107*a-n* can also be referred to generally as input devices.

Electronic device 100 further includes wireless communication subsystem (WCS) 142, which is coupled to antennas 148*a*-148*n*. According to one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148*a*-148*n* allow electronic device 100 to communicate wirelessly with wireless network 150 via transmissions of communication signals 194 to and from network communication devices 152*a*-152*n*, such as base stations or cellular nodes, of wireless network 150. In one embodiment, network communication devices 152*a*-152*n* contain electronic communication equipment to allow communication with electronic device 100.

Wireless network 150 further allows electronic device 100 to wirelessly communicate with second electronic devices 192, which can be similarly connected to wireless network 150 via one of network communication devices 152*a-n*. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. According to one or more embodiment, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive internet or Wi-Fi based calls via short range communication device 164. In one embodiment, electronic device 100 can communicate with WiFi router 196 wirelessly via short range communication device 164. In an embodiment, WCS 142, antennas 148*a-n* and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an in-coming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites. GPS device 160 can be the location sensor that detects when electronic device 100 is in a second location, which the processor identifies as a location that requires or triggers the changes to the device settings or operations.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. According to one or more embodiments, the measurements of these various sensors can also be utilized by processor 102 in the determining of the context of a communication. Electronic device 100 further includes housing 170 that contains/protects the components of electronic device 100.

In the description of each of the following figures, reference is also made to specific components illustrated within the preceding figure(s). Similar components are presented with the same reference number and some components may be provided with a subscripted reference number (e.g., **100*a*, 100*b***) to represent a same component/device being shown in a different context/configuration.

Figure 2A:
FIG. 2A depicts example travel routes between two locations, according to one or more embodiments.
Figure 2B:
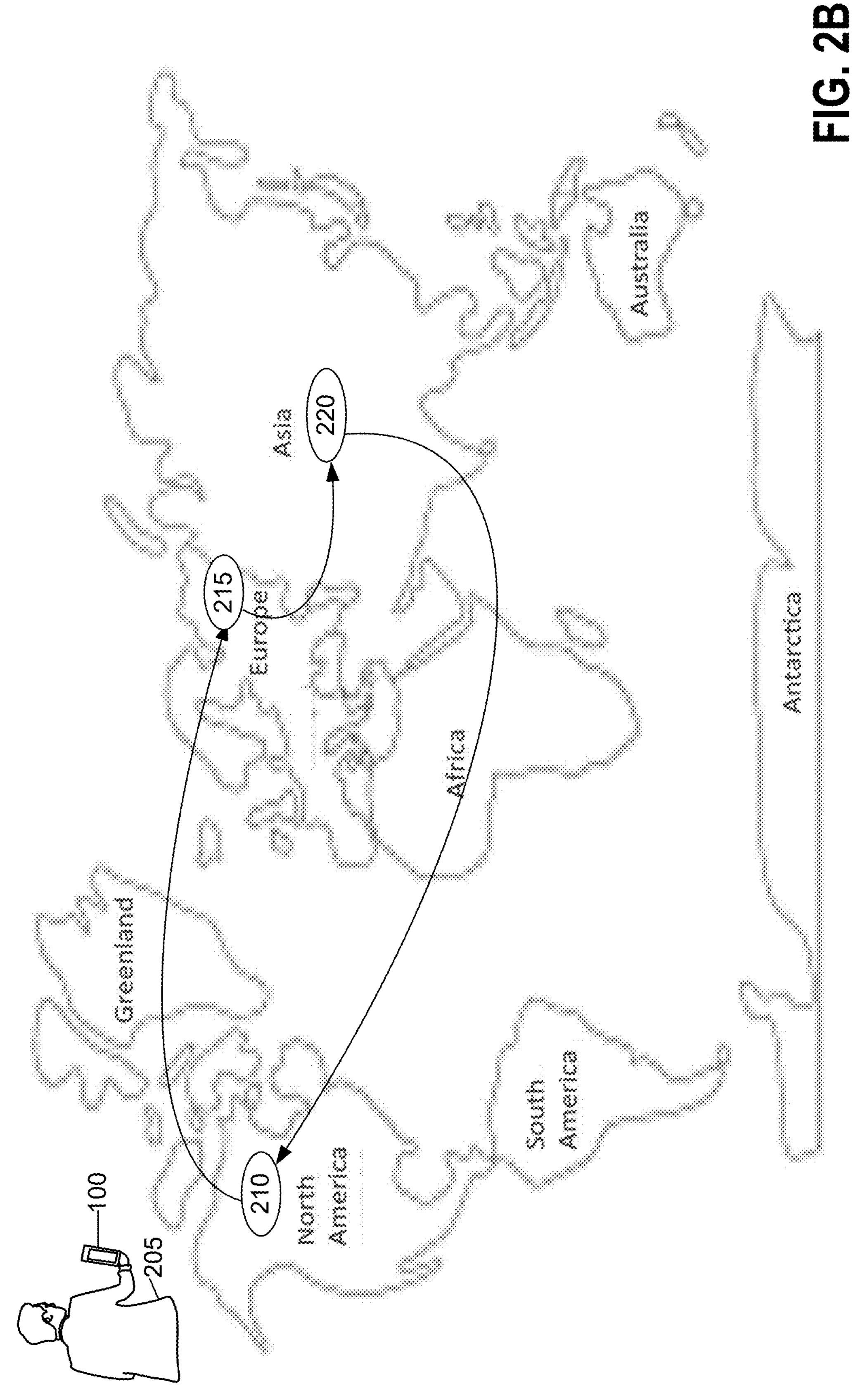
FIG. 2B depicts example travel routes with three locations, according to one or more embodiments.

FIGS. 2A-2B depict example travel routes that a user 205 can travel with the electronic device 100 between a first geographic location (or first location) 210 and a second geographic location (or second location) 215 (FIG. 2A) and between the first location 210 and the second location 215, then between the second location 215 and a third geographic location (or third location) 220 (FIG. 2B), according to different embodiments. As an example, the user 205 of the electronic device 100 can be someone residing in the United States, as the first location 210. The user can travel with the electronic device to a country in Europe, as the second location 215. According to one or more embodiments, the electronic device 100 operates according to location-specific requirements. Information about the device features associated with the electronic device 100 can be generated based on the location-specific requirements, which can be downloaded from a country website or travel site providing that information, and the preference(s) of the user 205. The user preference(s) include the applications that the user 205 frequently uses and the settings of the electronic device 100 that the user 205 prefers to have. The information about the device features can be used to set up the device features in the electronic device 100 to enable the user 205 to use the electronic device 100 while being at a certain location.

FIG. 2A depicts example travel routes between two locations, according to one or more embodiments. In a first travel route, when the user 205 travels from the first location 210 to the second location 215 (e.g., from the United States to England), the device features associated with the electronic device 100 at the first location 210 may not all be supported, functional, and/or may be expensive to use at the second location 215. For example, an application that the user 205 often uses at the first location 210 can be banned by a local governmental agency at the second location 215. As another example, when the user 205 is located at the second location 215, the electronic device 100 may detect that it is outside of the coverage area of a home network and activate data roaming to use data with a local network, resulting in unexpected charges. In one or more embodiments, one or more of the device features of the electronic device 100 can be adjusted. This can include, for example, installing new applications, uninstalling or reconfiguring existing applications, installing new hardware or modifying existing hardware configurations, and removing or deleting data. Each of these processes can be time consuming and the user may not be able to completed certain of the processes while the device is in the second location or away from the home location. When the user 205 returns from the second location 215 to the first location 210, the user 205 will again need to adjust the device features of the electronic device 100 to enable the user 205 to use the electronic device 100 while at the first location 210. The adjustments can include, for example, re-installing applications previously used with the electronic device 100 at the first location 210 and modifying other device settings that were used at the second location. For a second trip, the user 205 can travel between the first location 210 and a fourth location 225 (e.g., between Los Angeles and Boston). With the fourth location 225, the device features associated with the electronic device 100 while at the first location 210 may all be supported and functional when at the fourth location 225 since both locations are in the United States and the location specific requirements can be the same.

FIG. 2B depicts example travel routes among the first location 210, the second location 215, and the third location 220, according to one or more embodiments. When the user 205 travels from the first location 210 to the second location 215 and then from the second location 215 to the third location 220 before returning to the first location 210, the user 205 would need to adjust the device features of the electronic device 100 multiple times. This includes adjusting the device features for use at the second location 215, then adjusting for use at the third location 220, and finally adjusting for use at the first location 210. Without the features of the present disclosure, the user 205 will experience issues related to not being able to use the electronic device 100 at least for a certain period of time upon arrival at the second location 215 and at the third location 220 and on return to the first location 210.

Figure 3A:
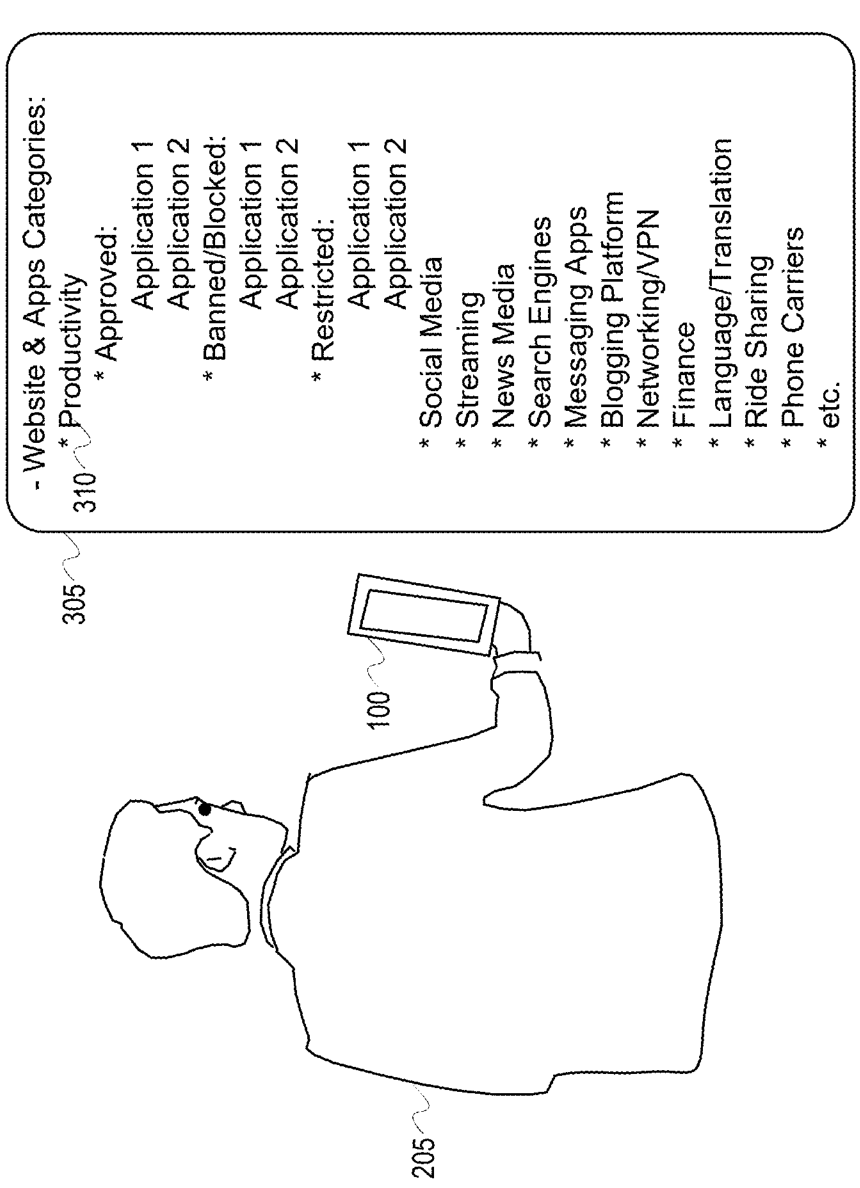
FIG. 3A depicts an example set of application and related website categories that can be used to group most of the common applications and websites that the user accesses using the electronic device while being at a location, according to one or more embodiments.

FIG. 3A depicts an example set of application and related website categories 305 that can be used to group most of the common applications and websites that the user 205 accesses on/via the electronic device 100 while being located at a first location, according to one or more embodiments. As depicted in FIG. 3A, the application and related website categories 305 include many different categories such as, for example, productivity category, social media category, messaging category, language category, etc. Depending on the location in which the electronic device 100 is being used by the user 205, it is possible that not all available applications and/or websites associated with a category can be used or allowed to be used by the user 205. For example, when the user 205 is at the third location 220, only certain applications under the productivity category 310 are approved, while other applications are either banned or restricted unless updated or reconfigured to comply with location specific requirements.

According to one or more embodiments, the device features of the electronic device 100 can include installed applications that the user 205 can and is allowed to use while being at a certain location. According to one or more embodiments, the device features of the electronic device 100 can include configurations that enable the user 205 to use the electronic device 100 to access or connect to various websites while being at a certain location. According to one or more embodiments, the device features of the electronic device 100 can include the capability for the electronic device 100 to be used by the user 205 to store or access certain category of data locally or via a cloud storage.

Figure 3B:
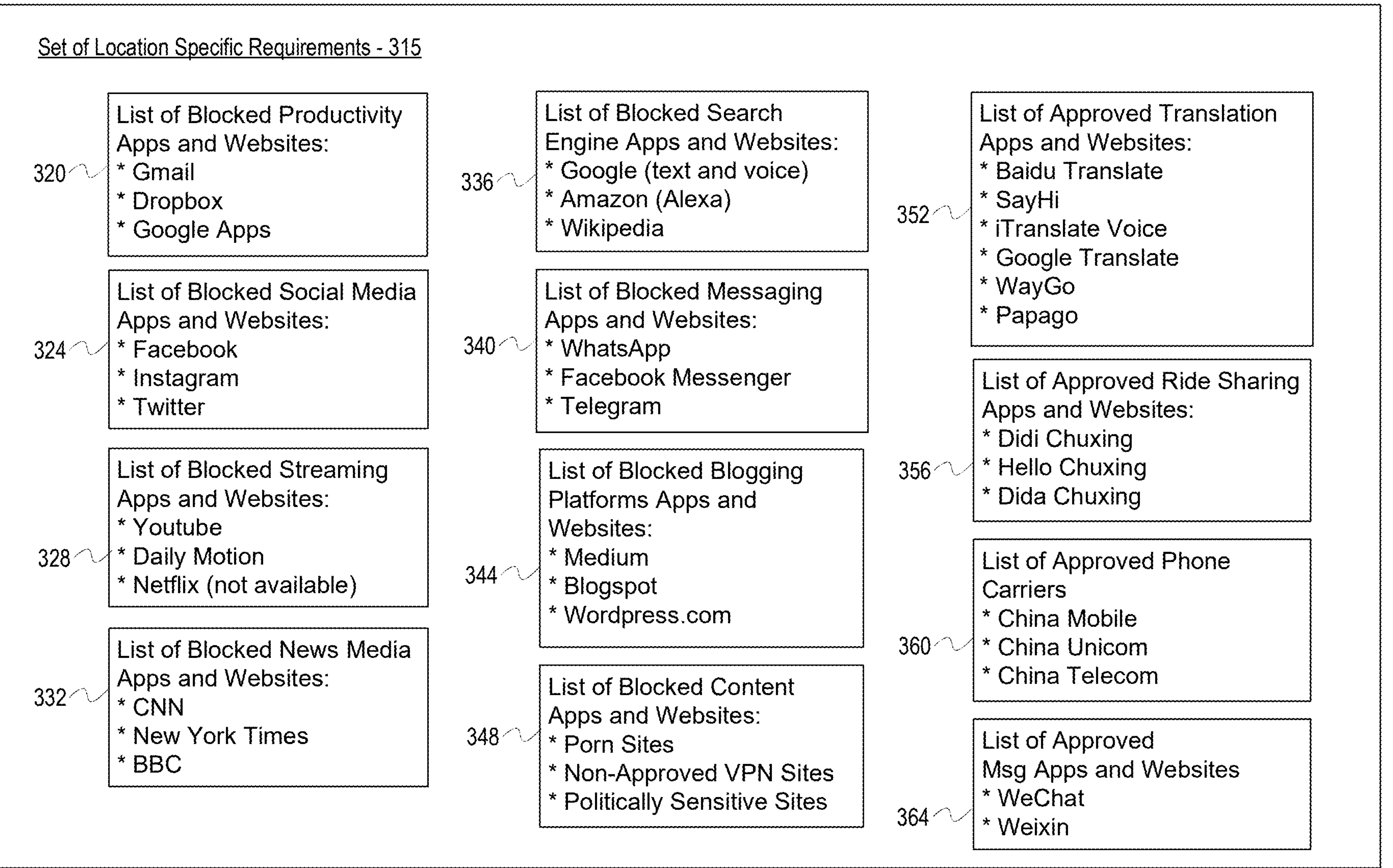
FIG. 3B depicts an example set of location specific requirements for a location, where the set of location specific requirements can be used to set the device features of the electronic device, according to one or more embodiments

FIG. 3B depicts an example set of location specific requirements 315 for a location such as the third location 220, where the set of location specific requirements 315 can be used to autonomously set the device features of the electronic device 100, according to one or more embodiments. The set of location specific requirements 315 is associated with China and shows multiple lists of blocked and approved applications and related websites grouped by categories. The set of location specific requirements 315 includes a list of blocked productivity applications and websites 320, which includes Gmail, Dropbox, and Google Apps. This means that the user 205, while being in China, cannot access emails using Gmail, cannot access documents stored in the Dropbox cloud storage, and cannot use any of the Google apps even when the applications are installed on the electronic device 100. The set of location specific requirements 315 includes a list of blocked social media applications and websites 324 which includes Facebook, Instagram, and Twitter. This means the user 205, while being in China, cannot post or share comments, pictures or videos with their friends and/or followers using the electronic device 100 and the social media sites Facebook, Instagram, and Twitter. The set of location specific requirements 315 also includes a list of blocked news media applications and websites 332, which includes Cable News Network (CNN), the New York Times, and British Broadcasting Corporation (BBC). This means that the user 205, while being in China, cannot use the electronic device 100 and the Internet to connect to a website for CNN, the New York Times, and/or the BBC to keep updated with news reported by western media. The set of location specific requirements 315 also includes an exclusive list of approved phone carriers 360, which includes China Mobile, China Unicom, and China Telecom. This means that the user 205, while being in China, cannot use a phone carrier that the user 205 is used to using while at a previous location to call someone or to use the Internet. This also means that the user 205 will need to configure the electronic device 100 to use one of the approved phone carriers.

The set of location specific requirements 315 also includes a list of blocked streaming applications and websites 328, a list of blocked search engine applications and websites 336, a list of blocked messaging applications and websites 340, a list of blocked blogging platforms applications and websites 344, a list of blocked content applications and websites 348, a list of approved translation applications and websites 352, a list of approved ride sharing applications and websites 356, and a list of approved messaging applications and websites 364. It should be noted that the example set of location specific requirements 315 is not exhaustive and may include other lists of banned and/or approved applications and/or related websites.

Figure 3C:
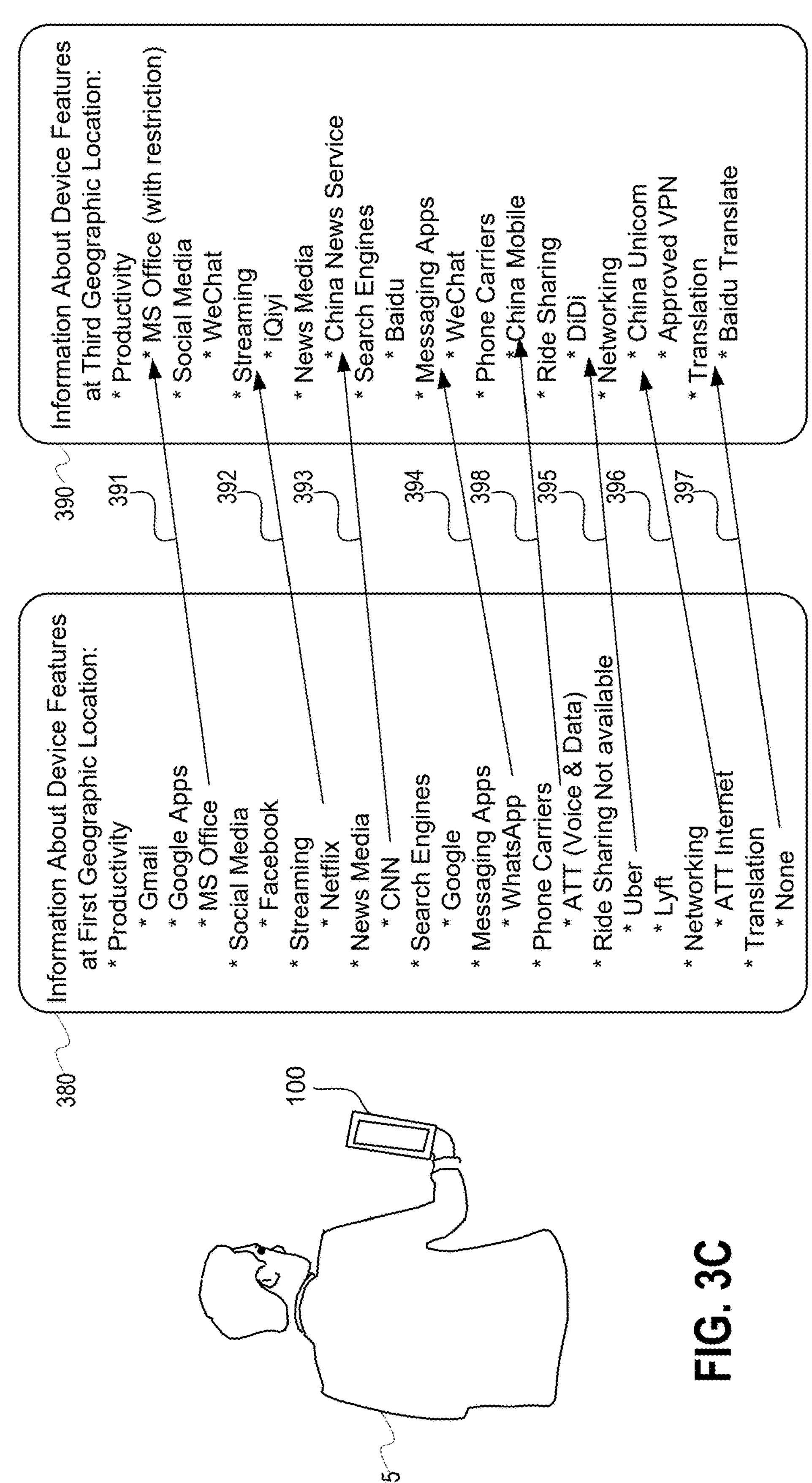
FIG. 3C depicts example information about device features at two different locations when applied to an electronic device used by the user when the user travels between the two locations, according to one or more embodiments.

FIG. 3C depicts example information about device features at two different locations that are applied to an electronic device used by the user when the user travels between the two locations, according to one or more embodiments. In this example, the first location is in the USA and the second location is in China. As depicted in FIG. 3C, the information about device features at first location 380 can include information about applications installed in the electronic device 100 and websites accessible using the electronic device 100 while the user 205 is at the first location. The applications and websites are grouped in different categories which can be a subset of the categories described in FIG. 3A. When the user 205 travels from the first location 210 to the third location 220, the information about device features at the first location 380 can be updated to generate the information about the device features at the third location 390. This update occurs because the set of location specific requirements associated with the third location 220 is different from the set of location specific requirements associated with the first location 210.

A set of location specific requirements can include at least requirements set by one or more of the local governmental agencies, the availability of the services, and the cost associated with the services. According to one or more embodiments, the set of location specific requirements can also include advice and/or recommendations from local experts and/or members of different communities with regards to data safety, financial safety, and/or personal safety. For example, when travelling to China, the set of location specific requirements can include areas to avoid for safety purposes, and a financial institution to get money exchanged to avoid getting counterfeit bills.

A device feature such as, for example, an application or a related website, can be allowed or approved for use or access with the electronic device 100 at the first location 210 (e.g., New York) but can be fully or partially restricted at the third location 220 (e.g., Shanghai). As an example of a partial restriction related to versions of a particular application, as shown by directional arrow 391, the productivity application "Microsoft Office" is an application that can be installed in the electronic device 100 and used by the user 205 while at the first location 210 but is not allowed or approved for use at the third location 220, unless the application is reconfigured to provide an approved version for use in the third location 220.

A device feature can be available in the first location 210 but is not available for use at the third location 220. For example, as shown by directional arrow 392, the streaming application "NetFlix" is an application that can be accessed by the electronic device 100 while at the first location 210; However, the streaming application "Netflix" is not a service that is available in the third location 220. As such, in order for the user 205 to stream movies, an alternative streaming application "iQiyi" can be installed as a device feature of the electronic device 100 for use while the user 205 is at the third location 220. Similarly, as shown by directional arrow 395, even though both of the ride sharing application "Uber" and "Lyft" are identified as device features of the electronic device 100 while the user 205 is at the first location 210, those services are not available in the third location 220. As such, in order for the user 205 to use ride sharing while at the third location 220, an alternative ride sharing application "DiDi" is identified and installed (or activated—if already installed) as a device feature of the electronic device 100.

A device feature can be available in the first location 210 but is not approved or is banned at the third location 220. For example, as shown by directional arrow 393, the news media website "CNN" can be accessed using the electronic device 100 while the user 205 is at the first location 210, but because "CNN" is banned and cannot be accessed from the third location 220, an alternative news media website "China News Service" can be installed and used to enable the user 205 to access news information while at the third location 220. Similarly, as shown by directional arrow 394, the messaging application "WhatsApp" can be used by the user 205 at the first location 210 using the electronic device 100, but "WhatsApp" is banned at the third location 220. As such, an alternative messaging application "WeChat" is used to enable the user 205 to use the electronic device 100 to engage in messaging communication while in the third location 220.

A device feature can be associated with the electronic device 100 while the user 205 is at the first location 210 and not be associated with the electronic device 100 while the user 205 is at the third location 220, or vice versa. This can be because the user 205 has no need for that service or application while at one location but does have a need for the feature while at the other location. For example, as shown by directional arrow 397, the translation application "Baidu Translate" is not identified as a device feature of the electronic device 100 while the user 205 is at the first location 210 because the user 205 does not need any translation help while at the first location 210.

A device feature can be associated with the electronic device 100 while the user 205 is at the first location 210 and also be associated with the electronic device 100 while the user 205 is at the third location 220. In such situation, the device feature can be maintained in the electronic device 100 and be used by the user 205 at the third location, similar to how the feature is used while the user 205 is at the first location. As can be appreciated, the process of updating the device features for the electronic device 100 when travelling can be tedious and time consuming when performed manually. Furthermore, the process of updating the device features, when performed incorrectly, can expose the user 205 to potential risks. The present disclosure provides the benefits of triggering an autonomous modification of the device features to accommodate use of the device in the geographic location to which the device is being taken by the user, without requiring direct user setting of some or all of the modifications performed. The autonomous nature of the modification is based on a predictive feature of the device that can involve an artificial intelligence (AI) module determining that the user is about to travel to the second location based on received and detected information from one or more information sources. As an example, the AI module can access calendar data 128 of the user and determine that the user is going to be travelling to the second location at a specific date and time. The AI module can then schedule the modifications to occur before the user gets on the flight for travel or at a different time that allows the features to be available when needed, such as while on the flight or when the user arrives in the second location.

Figure 4A:
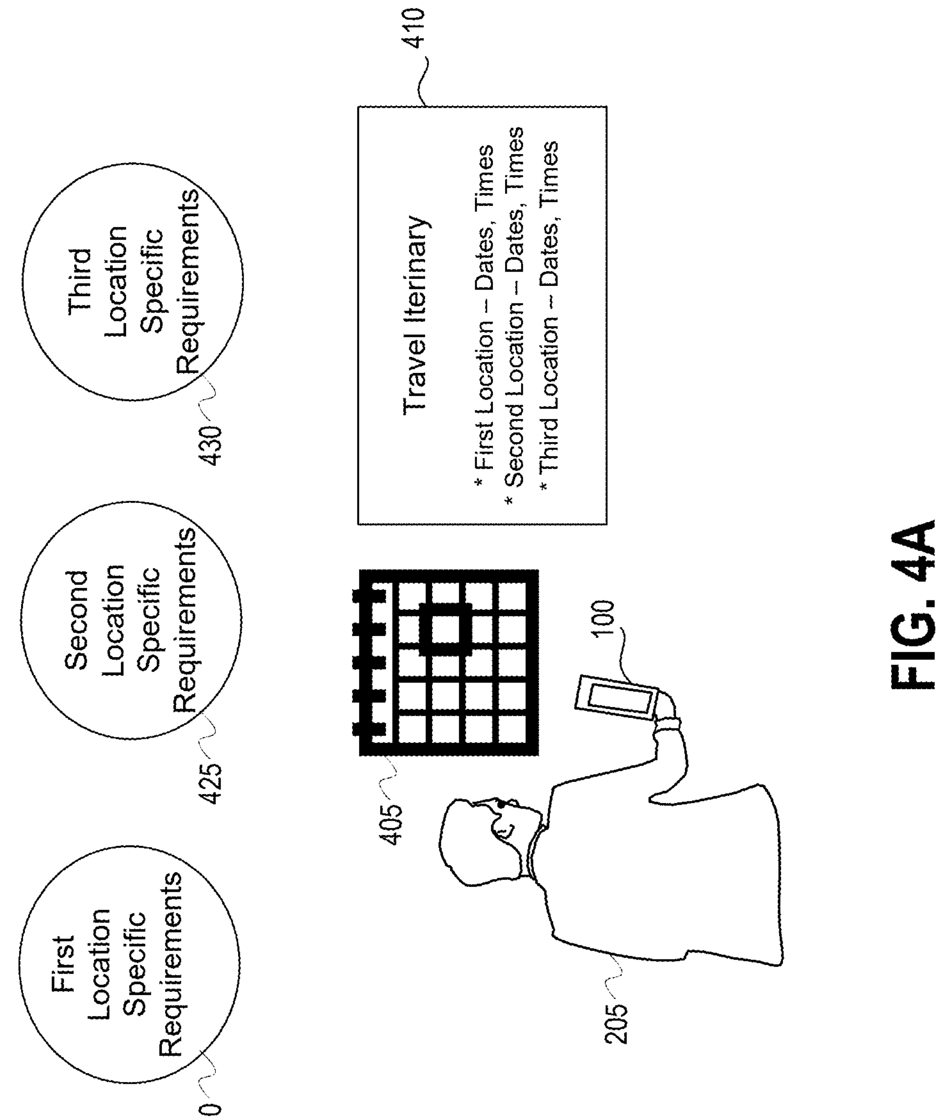
FIG. 4A depicts example sources of travel information that can be used by a location-based computing requirement management (LCRM) module to prepare the electronic device according to different location specific requirements to enable the user to use the electronic device efficiently at each location, according to one or more embodiments.

FIG. 4A depicts example sources of travel information that can be used by the location-based computing requirement management (LCRM) module 126 (FIG. 1) to prepare the electronic device 100, using different sets of location specific requirements, to enable the user 205 to use the electronic device 100 efficiently at each location, according to one or more embodiments. To prepare the electronic device 100 for the user's travel activities, one or more of the electronic calendar 405 and the travel itinerary 410 can be used by the location-based computing requirement management module 126 to determine a location and a date and time that the user 205 will be arriving at the location. For example, the electronic calendar 405 can be a Google calendar, and the travel itinerary 410 can be an electronic travel itinerary generated based on an airline reservation or by a travel agency showing locations and dates of travel and arrival.

For one or more embodiments, based on determining the location that the user 205 will be traveling to, the location-based computing requirement management module 126 can determine the location specific requirements according to the determined location. For example, the travel itinerary 410 shows that the user 205 will be travelling to several locations, and each location is associated with a different location specific requirement, such as one of the location specific requirements 420, 425 and 430. For one or more embodiments, the location specific requirements for multiple locations can be predetermined and stored in a database. For example, the location specific requirements can include requirements as applied to different cities worldwide such as Dubai, Shanghai, Bangkok, New Delhi, Pyongyang, Moscow, New York, etc. Differences in culture, religious belief, political belief, and economics in different geographic locations can cause the location specific requirements to be different for each geographic location.

For one or more embodiments, the location-based computing requirement management module 126 can periodically perform operations to update the location specific requirements for each of the cities. When the location-based computing requirement management module 126 identifies the location that the user 205 will be travelling to, the location-based computing requirements management module 126 can apply the location specific requirements for the location in order to determine the device features necessary to operate the electronic device 100 at that location. Information about the frequently used applications and the current hardware settings of the electronic device 100 can also be used to determine the device features for the electronic device 100 at the travel-to location.

Figure 4B:
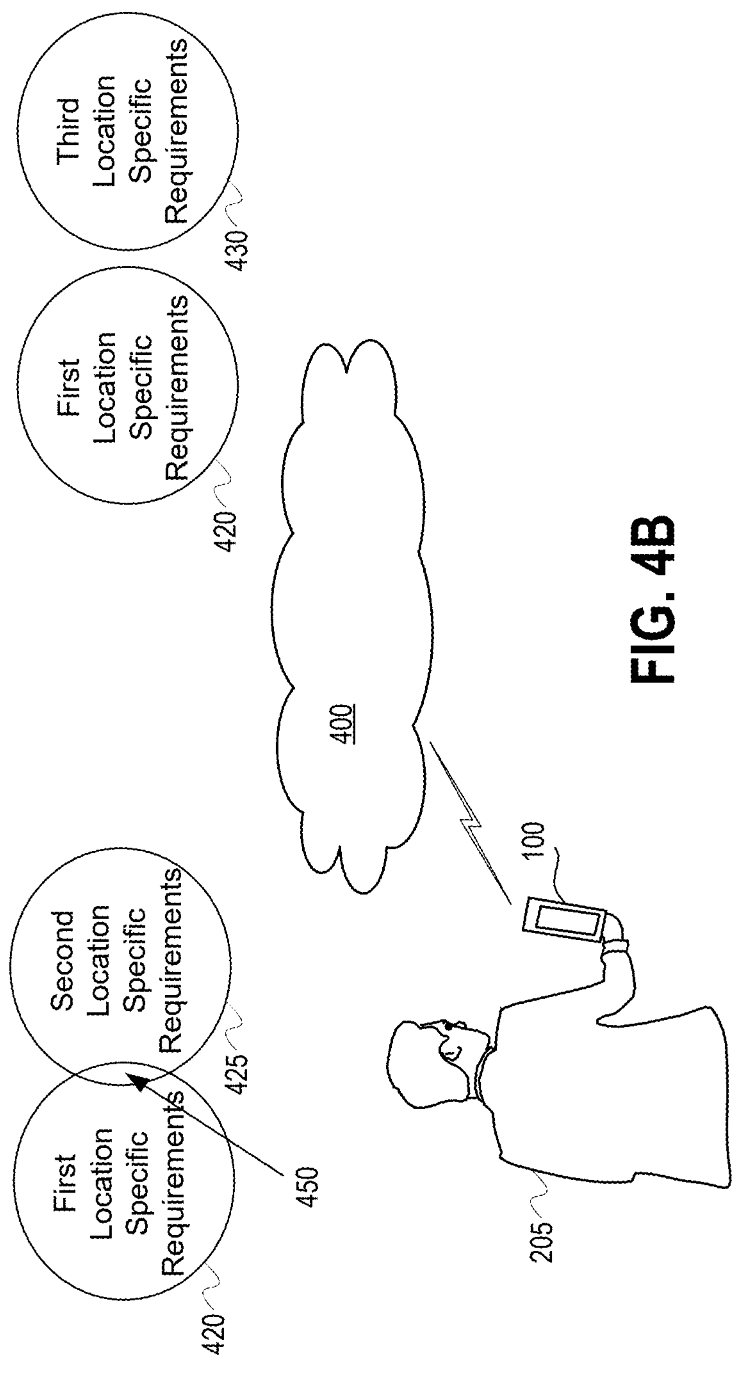
FIG. 4B depicts different sets of location specific requirements for different locations with two of the sets of location specific requirements sharing some common requirements, according to one or more embodiments.

FIG. 4B depicts different sets of location specific requirements for different locations with two of the location specific requirements 420 and 425 sharing some common requirements 450, according to one or more embodiments. As depicted in FIG. 4B, three sets of location specific requirements 420, 425, and 430 represent the respective first location 210, second location 215, and third location 220 (FIG. 2B). The first location 210 can be considered as a home location at which the user 205 uses the electronic device with the first set of location specific requirements 420 more frequently than the user 205 uses location specific requirements 425 and 430.

According to one or more embodiments, one or more of the three sets of location specific requirements 420, 425, and 430 can be stored in a cloud-based storage device (not shown) and can be downloaded to the electronic device 100 by the location-based computing requirement management module 126 via the network 400. Alternatively, one or more of the three sets of location specific requirements 420, 425, and 430 can be stored in a local storage device (e.g., storage 104, FIG. 1) accessible by location-based computing requirement management module 126.

According to one or more embodiments, the location-based computing requirement management module 126 is configured to determine whether the location specific requirements currently being applied to the electronic device 100 at a first location share some common requirements with the location specific requirements for a second location that the user 205 will be travelling to. When there are some common requirements, the location-based computing requirement management module 126 can enable the electronic device 100 to maintain the device features associated with the common requirements in preparation for the user 205 to use the electronic device 100 at the second location. For example, when both the first and the second sets of location specific requirements 420 and 425 indicate that, for the social media category, "Facebookl" is an approved application, then the "Facebook" application would be associated with the common requirements 450, and the location-based computing requirement management module 126 would not delete (or reconfigure) the "Facebook" application from the electronic device 100. Similarly, when both the first and the second sets of location specific requirements 420 and 425 indicate that no "anti-government content" is allowed to be stored in any electronic device 100 at any time, then the "anti-government content" restriction would be associated with the common requirements 450, and the location-based computing requirement management module 126 would maintain blocking any "anti-government content" from being stored in any storage device associated with the electronic device 100. For one or more embodiments, when there is no common requirements between two sets of location specific requirements (e.g., the sets of location specific requirements 420 and 430), the location-based computing requirement management module 126 can be configured to perform one or more of the following operations: uninstalling or reconfiguring existing applications; removing or reconfiguring current hardware settings; installing new applications or new alternative applications; and removing or modifying data content.

FIGS. 5-8 depict flow diagrams of different methods for determining device features for an electronic device when the user of the device travels to a different location such that the electronic device can be operated at a location according to different set of location-specific requirements, according to one or more embodiments. In at least one embodiment, the electronic device 100 is controlled by processor 102, which executes code of the location-based computing requirement management module 126 (FIG. 1) to configure the electronic device 100 with device features according to location-specific requirements and includes functionality described for method 500 (FIG. 5), as well as method 600 (FIG. 6), method 700 (FIG. 7), method 800 (FIG. 8), and method 900 (FIG. 9).

The description of methods 500/600/700/800/900 is provided with general reference to the specific components illustrated within the preceding FIGS. 1-4B, and specific components referenced in methods 500/600/700/800/900 may be identical or similar to components of the same name used in describing preceding FIGS. 1-4B.

Figure 5:
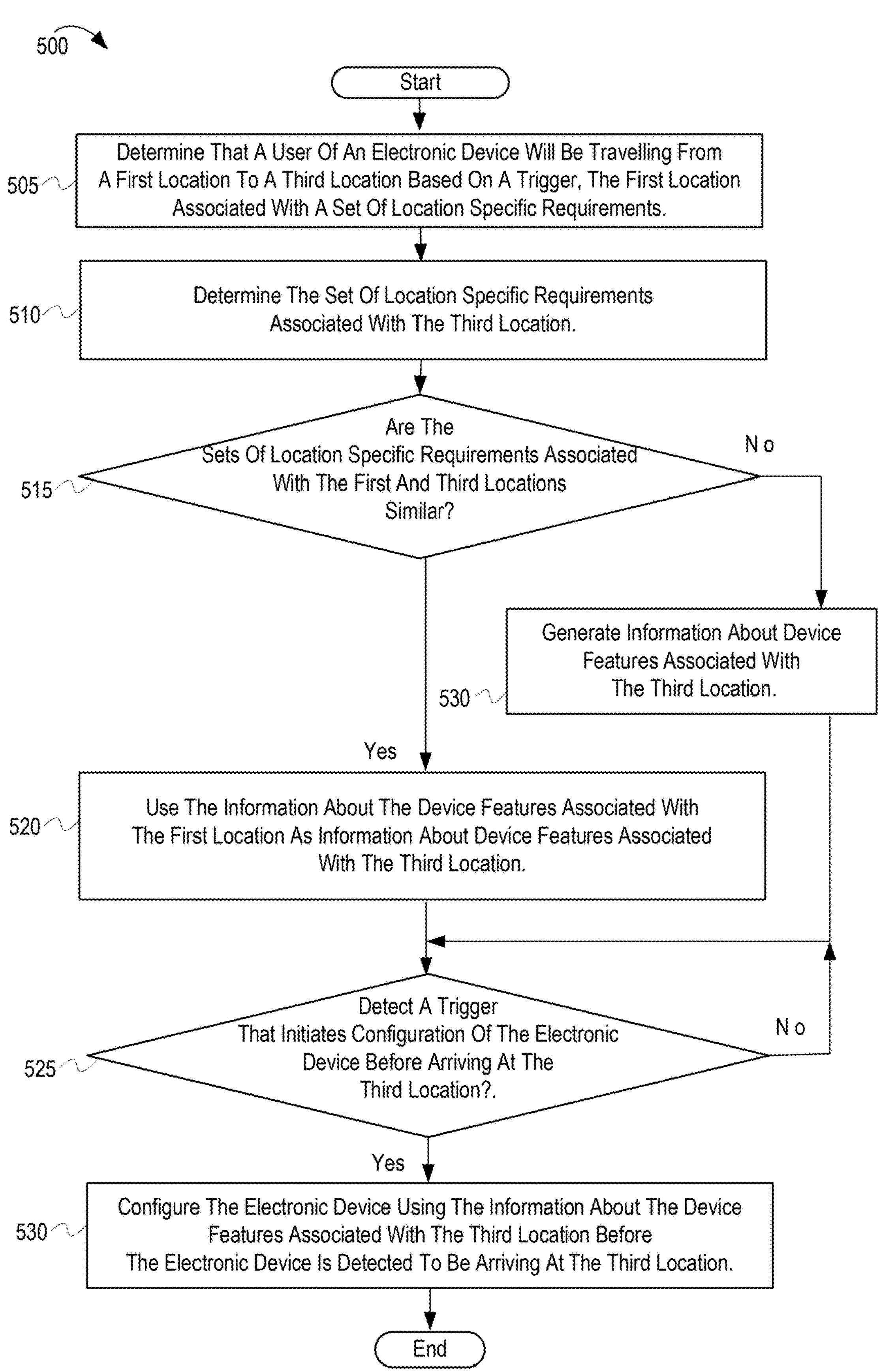
FIG. 5 depicts a process of determining a set of location specific requirements of a location and determining device features of the electronic device when the user travels to the location, according to one or more embodiments.

FIG. 5 depicts a process of determining a set of location specific requirements for a location and determining device features of the electronic device 100 when the user 205 travels to the location, according to one or more embodiments. The method 500 can be applied to the electronic device 100 by the processor 102 to prepare the electronic device 100 when the user 205 of the electronic device 100 travels from one location (a first location) to another location (a second or next location). The method 500 uses the travel example shown in FIG. 2B where the user 205 travels from the first location 210 to the third location 220. The method 500 starts at block 505 where the processor 102 determines that the user 205 will be travelling with the electronic device 100 from the home location (or first location) 210 to another location (or third location) 220. The first location 210 is associated with a set of location specific requirements, and the electronic device 100 is configured to operate with device features consistent with the set of location specific requirements. The determination can be performed using information from an electronic calendar 405 or a travel itinerary 410. Based on having determined the third location 220, the method 500 determines the set of location specific requirements of the third location 220 (block 510). According to one or more embodiments, the operations of block 510 can include locating and accessing an existing set of location specific requirements of the third location 220.

At block 515, the set of location specific requirements determined at block 510 is evaluated to determine whether they are similar to the set of location specific requirements associated with the first location 210. When both sets of location specific requirements are similar, the method 500 continues to block 520 where the information about the device features associated with the set of location specific requirements of the third location is generated using the information about the device features associated with the set of location specific requirements of the first location. According to one or more embodiments, the method 500 includes determining whether the information about the device features associated with the third location already exists and is stored in an accessible storage area. The storage area can be a secured storage area to protect the information about the device features associated with the third location from being corrupted or unintentionally modified. The storage area can be local to the electronic device or remote from the device and accessible via a network connection. When the information about the device features associated with the third location already exists, the method 500 retrieves the information from the storage area instead of generating a new one.

At block 525, the method 500 includes determining whether a trigger was detected. The trigger can indicate that the user will be arriving at the third location 220. The trigger can be related to one or more of GPS positioning coordinates and a combination of date and time. The trigger can be used to enable the configuration of the electronic device 100 to complete before the user 205 arrives at the third location 220. When no trigger is detected, the method 500 continues to monitor for the trigger at block 525. When a trigger is detected, the method 500 continues to block 530.

At block 530, the method 500 includes configuring the electronic device 100 with device features based on the information about the device features associated with the third location 220. The operations performed in block 525 may be minimal when the sets of location specific requirements of the first location 210 and the third location 220 are similar. The method 500 ends after completion of the operations in block 530.

From block 515, when the sets of location specific requirements of the first and third locations 210 and 220 are different, the method 500 continues to block 530 where the information about the device features associated with the third location is retrieved or generated. The information about the device features associated with the third location can be generated using the information about the device features associated with the first location. Examples of the information about the device features associated with the first location and the information about the device features associated with the third location are shown in FIG. 3C. From block 530, the method 500 continues to block 525 where the electronic device 100 can be configured with the device features based on the information about the device features associated with the third location.

Figure 6:
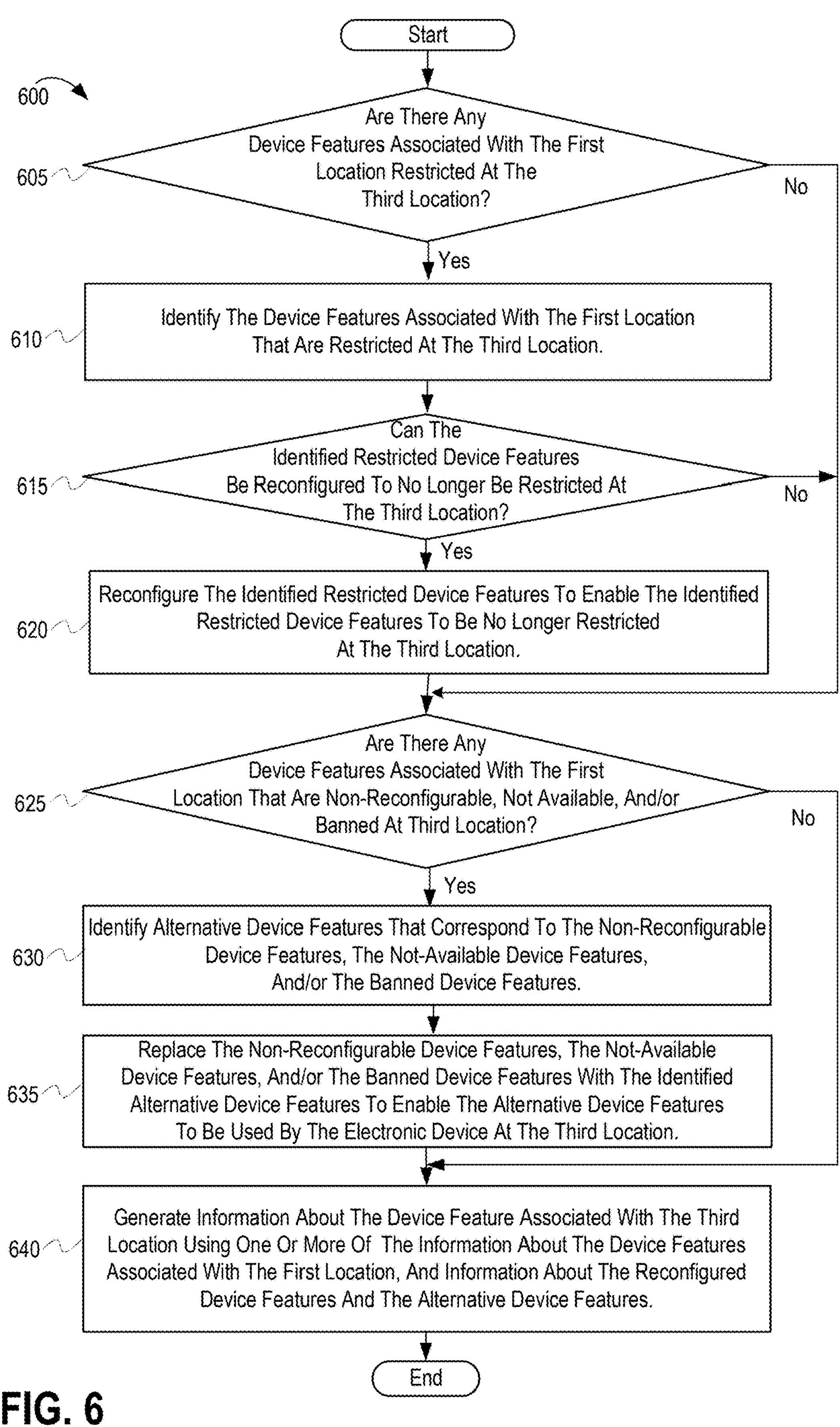
FIG. 6 depicts a process of determining the information about the device features associated with a third location using the information about the device features associated with the first location where the first set of location specific requirements associated with the first location are different from the set of location specific requirements of the third location, according to one or more embodiments.

FIG. 6 depicts a process of determining the information about the device features associated with the third location using the information about the device features associated with the first location, where the first set of location specific requirements associated with the first location are different from those of the third location, according to one or more embodiments. The method 600 can be applied to the electronic device 100 by the processor 102 to prepare the electronic device 100 before the user 205 and the electronic device 100 arrives at the third location. The method 600 is described using the example shown in FIG. 3C when the user 205 travels between the first location 210 and the third location 215.

The method 600 starts at block 605. According to one or more embodiments, method 600 includes the processor 102 determining whether there are any device features associated with the first set of location specific requirements that are restricted at the third location. A device feature that is restricted (or restricted device feature) is prevented or banned from being used but can be allowed or approved when the device feature is reconfigured to satisfy certain requirements specified in the third set of location specific requirements. When one or more device features used with the electronic device 100 at the first location are restricted at the third location, the method 600 continues to block 610 where the restricted device features are identified. An example of a restricted device feature is shown by directional arrow 391 in FIG. 3C. The method 600 then continues to block 615 where the processor 102 determines whether any of the identified restricted device features can be reconfigured. When one or more restricted device features can be reconfigured, the method 600 continues to block 620 where the one or more restricted device features are reconfigured to satisfy the third set of location specific requirements. According to one or more embodiments, the method 600 can also perform operations to reconfigure or enable the user 205 to reconfigure device features related to hardware components of the electronic device 100. For example, as shown by directional arrow 398 in FIG. 3C, the reconfiguration can include changing the phone carriers from "ATT" to "China Mobile" or turning off the roaming, the auto sync and auto update features of the electronic device 100 or replacing a Subscriber Identity Module (SIM) card in the electronic device 100 with a local SIM that can be used to work with "China Mobile."

From block 620, the method 600 continues to decision block 625 where the processor 102 determines whether any of the device features associated with the first location 210 are non-reconfigurable, not available, and/or banned at the third location 220. As described with FIG. 3C, when a device feature is not reconfigurable, not available and/or banned at the third location 220, an alternative device feature can be identified or no replacement feature is provided.

From decision block 625, when one or more of the device features associated with the first location 210 are non-reconfigurable, not available, and/or banned at the third location 220, the method 600 continues to block 630 where the processor 102 identifies alternative device features, if available, to replace one or more of the non-reconfigurable device features, the not-available device features, and/or the banned device features. An example of determining an alternative device feature is shown by directional arrow 397 of FIG. 3C where the device feature for translation is not needed (or not available) while the user 205 is at the first location 210 but is needed when the user 205 is at the third location 220. According to one or more embodiments, the method 600 can include operations to download, onto the electronic device 100, alternative applications together with accessories related to the applications. For example, when the application is a translation application, accessories such as language packs can also be downloaded to enable the user 205 to use the translation application offline. An example of a banned device feature is shown by directional arrow 394 where the "WhatsApp" application is banned at the third location 220 and an alternative device feature "WeChat" application is identified for the third location 220. Another example of a banned device feature is shown by directional arrow 396 where the "ATT" application used for accessing the Internet at the first location 210 is banned at the third location 220, and an alternative device feature such as an approved virtual private network (VPN) can be identified for the third location 220.

At block 635, the processor 102 replaces the one or more non-reconfigurable device features, not available device features, and/or banned device features with the identified alternative device features to enable the alternative device features to be used by the electronic device 100 at the third location 220. The operations at block 635 can include, for example, installing the applications associated with the alternative device features. At block 640, the processor 102 generates the information about the device feature associated with the third location 220 using one or more of the information about the device features associated with the first location 210 and the identified alternative device features.

From decision block 605, when no device feature used with the electronic device 100 at the first location 210 is restricted at the third location 220, the method 600 continues to decision block 625, which was described earlier. From decision block 615, when there is one or more restricted device features but the restricted device features cannot be reconfigured, the method 600 continues to decision block 625, which was described earlier. From decision block 625, when none of the device features associated with the first location are considered as non-reconfigurable for the third location, not available while at the first location, and/or banned at third location, then there is no need to identify a corresponding alternative device feature, and the method 600 continues to the previously described block 640.

Figure 7:
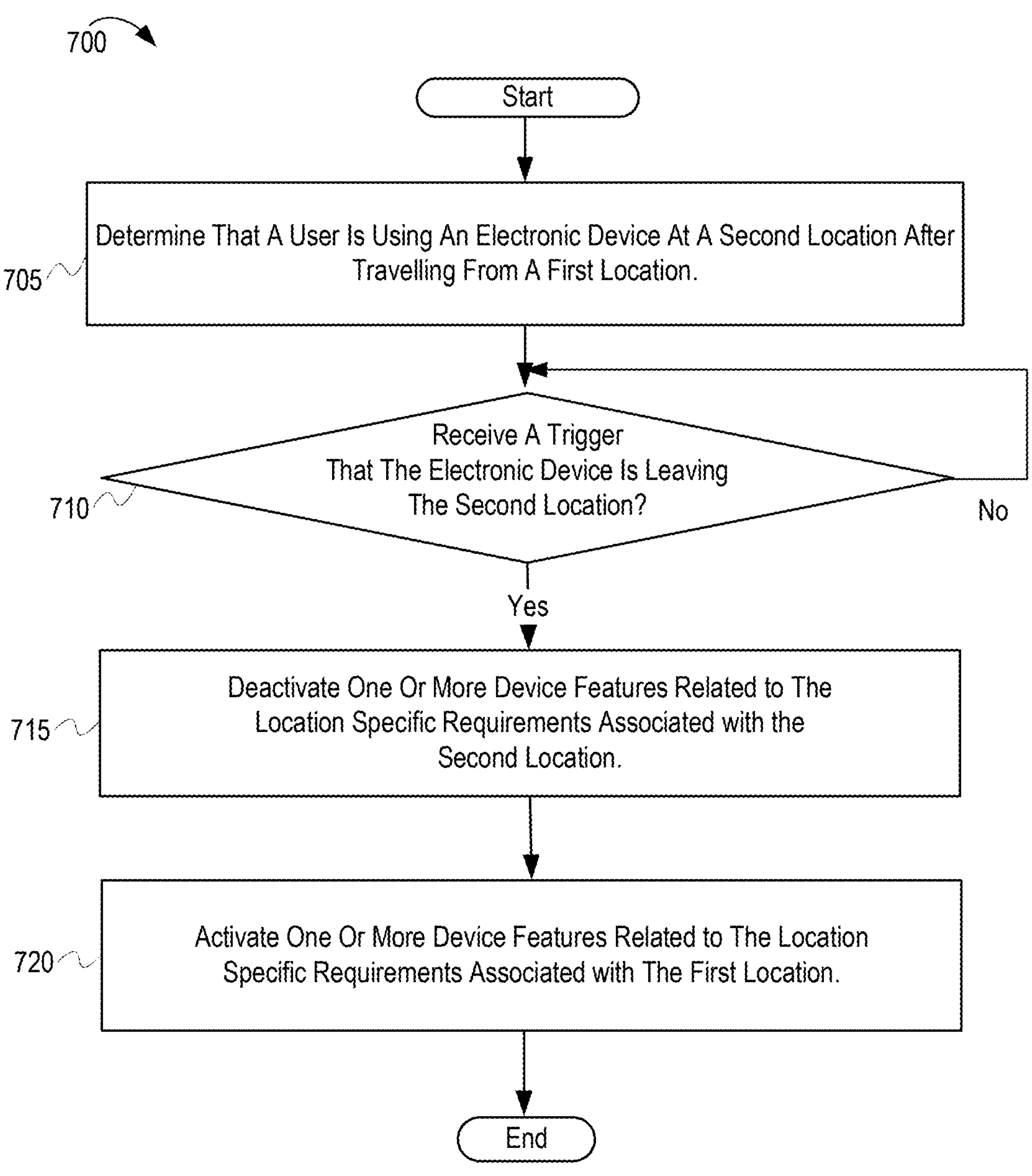
FIG. 7 depicts a process of deactivating device features associated with a second location that the electronic device user is travelling from to return to a home location and activating device features associated with the home location, according to one or more embodiments.

FIG. 7 depicts a process of deactivating device features associated with a location that the user 205 with the electronic device 100 is leaving to return to the home location and activating device features associated with the home location, according to one or more embodiments. The method 700 may be applied to an electronic device 100 controlled by processor 102 to detect when the deactivating operations and the activating operations are to be performed for the electronic device 100, according to one or more embodiments. The method 700 is described using the example shown in FIG. 3C when the user 205 travels between the third location 215 and the first (or home) location 210.

The method 700 may start at block 705. The processor 102 may execute code included in the location-based computing requirement management module 126 to enable the processor 102 to detect that the user 205 is using the electronic device 100 at the third location 220 after travelling from the home or first location 210. At block 710, the method 700 can determine whether the user 205 is leaving the third location 220 based on detecting one or more triggers. The one or more triggers can include one or more of a time-based trigger and a location-based trigger. For example, an arrival time and a departure time associated a travel reservation for travel to the third location 220 can be a trigger. As another example, GPS coordinates associated with the third location 220 can be a trigger. When no trigger is detected, the method 700 continues to monitor for the trigger at decision block 710. When one or more triggers is detected, the method 700 continues to block 715 where one or more device features related to the third set of location specific requirements associated with the third location 220 is modified. In one embodiment, the processor autonomously modifies (e.g., activates and/or deactivates) specific features, applications, and/or hardware settings of the electronic device 100. According to one or more embodiments, the deactivation is performed as part of a process to prepare the electronic device 100 so that the user 205 can continue using the electronic device 100 upon arriving at the first location 210. For example, referring to FIG. 3C, the deactivation of the device features can include uninstalling the messaging app "WeChat" and the ride sharing app "DiDi" from the electronic device 100. According to one or more embodiments, the method 600 can also include operations to remove data from the electronic device 100 in situations when the data is banned or prohibited at the first location 210. According to one or more embodiments, instead of deleting or removing the data, the data can be stored in a secured storage area such that the data cannot be accessed while the user 205 is at a location where the data is prohibited.

At block 720, the method 700 can include operations to continue preparing the electronic device 100 so that the electronic device 100 can be used by the user 205 at the first location 210. These operations include modifying one or more device features related to the first set of location specific requirements. For example, referring to FIG. 3C, the modification of the device features can include autonomously installing (or re-activating) the messaging app "WhatsApp" and the ride sharing app "Uber" onto the electronic device 100. According to one or more embodiments, the modification can include adjusting settings such that a previously installed application can become a primary application without having to reinstall the application. According to one or more embodiments, the method 700 can also include operations to restore data onto the electronic device 100 in situations when the data is banned or prohibited at the third location 220 but is not banned at the first location 210. The method 700 ends upon completion of the operations at block 720. According to one or more embodiments, the operations performed by the method 700 can also be applied when the user 205 leaves the third location 220 for a location different from the first location 210 that does not have a specific set of location requirements. In this scenario, the default settings/features of the electronic device 100 are restored, re-installed, or re-activated, similar to the electronic device being operated at the first (home) location.

Figure 8:
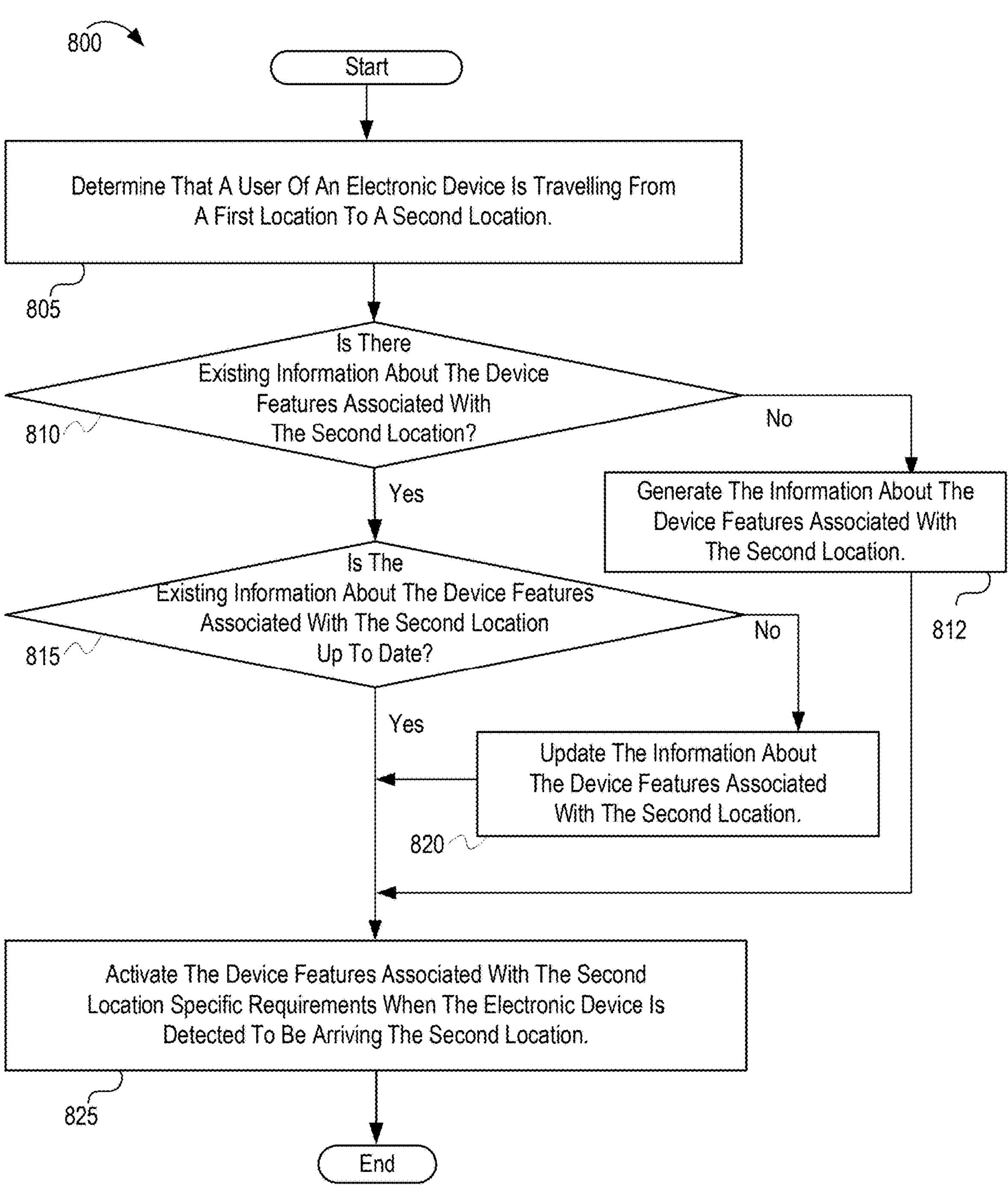
FIG. 8 depicts a process of using existing information about device features associated with a location and updating the information about the device feature when the user travels from one location to another location, according to one or more embodiments.
Figure 9:
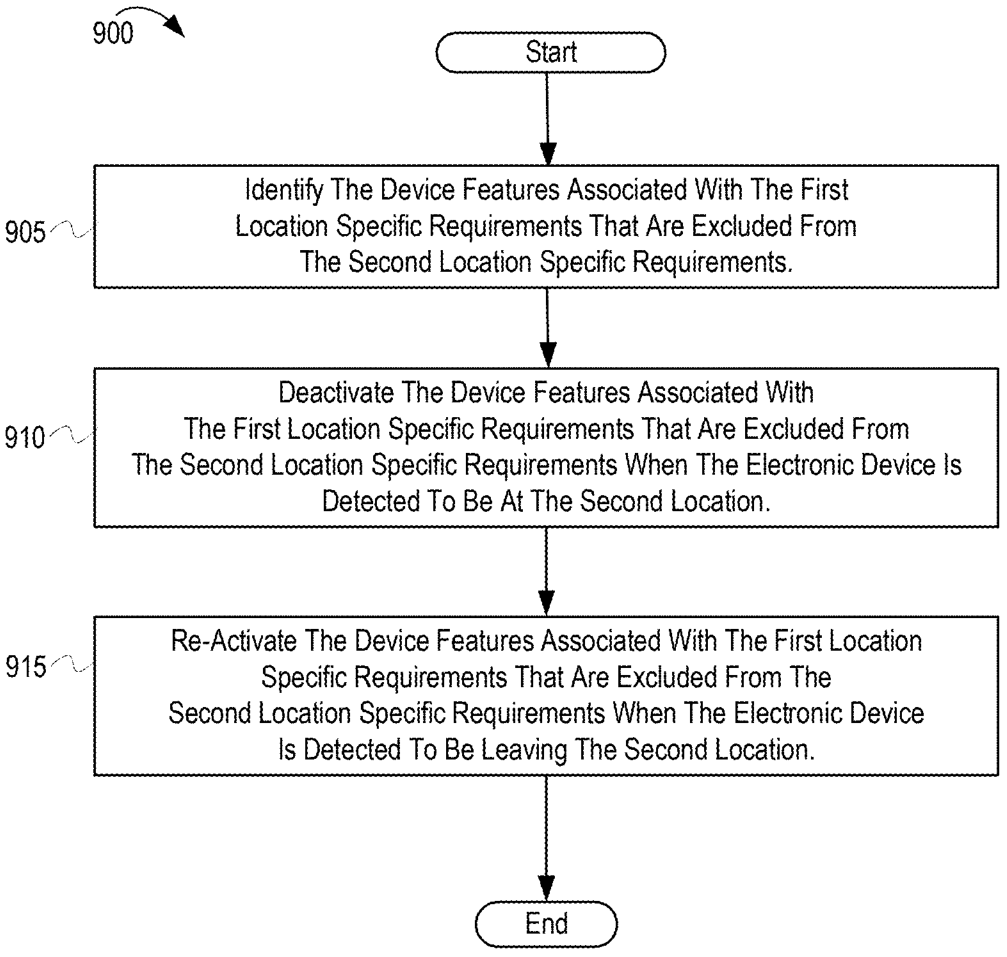
FIG. 9 depicts a process of comparing two sets of location specific requirements, each associated with a different location, where there are some common requirements between the two sets of location specific requirements, in order to determine device features to modify, according to one or more embodiments.

FIG. 8 depicts a process of using and updating existing information about device features associated with a location when the user 205 travels from one location to another location, according to one or more embodiments. The method 800 may be applied to an electronic device 100 controlled by processor 102 to detect whether the user 205 has previously travelled to a location that the user 205 is travelling to such that information previously generate can be retrieved for use for the user's next travel to the same location. The method 800 is described using the example shown in FIG. 3C when the user 205 travels between the first location 210 and the second location 215.

Method 800 starts at block 805 where the processor 102 determines that the user 205 is travelling with the electronic device 100 from the first location 210 to the second location. The determination can be performed based on information included in one or more of the electronic calendar 405 and the travel itinerary 410. At decision block 810, the processor 102 performs operations to determine whether there is existing information about the device features associated with the second location. Examples of the information about the device features are depicted in FIG. 3C. The information about the device features associated with the second location may exist if the information was previously generated based on the user 205 having previously travelled with the same electronic device 100 to the second location.

From decision block 810, when there is no existing information about the device features associated with the second location, the method 800 continues to block 812 where the processor 102 performs operations to generate the information about the device features associated with the second location. Details of the operations performed in block 812 are described in FIG. 6. From block 812, the method 800 continues to block 825.

From decision block 810, when there is an existing information about the device features associated with the second location, the method 800 continues to decision block 815 where the processor 102 performs operations to determine whether the existing information about the device features associated with the second location is up-to-date. The determination of whether the existing information is up-to-date can include comparing the current version of the second set of location specific requirements associated with the second location with the previous version of the same set of requirements when the existing information about the device features was generated. The current version can be downloaded from a travel site or other online server providing the location requirements.

From decision block 815, when the existing information is not up-to-date, the method 800 continues to block 820 where the processor 102 performs operations to update the information about the device features associated with the second location. The update can be based on the current version of the set of location specific requirements associated with the second location. The method 800 then continues to block 825. From decision block 815, when the existing information is up-to-date, the method 800 continues to block 825 where the device features associated with the second location can be activated prior to the user 205 arriving at the second location. The method 800 ends upon completion of the operations of block 825.

FIG. 9, depicts a process of comparing two sets of location specific requirements, each associated with a different location, where there are some common requirements between the two sets of location specific requirements, in order to determine device features to activate or deactivate, according to one or more embodiments. The method 900 may be applied to an electronic device 100 controlled by processor 102 to enable the user 205 to use the electronic device 100 while travelling between two locations.

The method 900 starts at block 905 where the processor 102 executes code included in the location-based computing requirement management module 126 to enable the processor 102 to identify the device features associated with the location specific requirements of the first location that are excluded from the location specific requirements of the second location. These excluded device features can include device features that are allowed in the first location but are banned in the second location. For example, as identified by directional arrow 393 in FIG. 3C, the device feature related to the news media "CNN" is allowed in one location but is banned in the other location. At block 910, when the electronic device 100 is detected to be arriving at the second location, the method 900 deactivates the excluded device features that are allowed in one location but are banned in the other location. The deactivation can be performed autonomously. Using the above example, the device feature related to the news media "CNN" is deactivated. According to one or more embodiments, when the electronic device 100 is detected to be arriving at the second location, the method 900 can also include performing operations to activate one or more device features that are allowed according to the location specific requirements of the second location. At block 915, when the electronic device 100 is detected to be leaving the second location, the method 900 can re-activate the device features associated with the first location according to the location specific requirements associated with the first location. The reactivation can be performed autonomously. Using the same example, the device feature related to the news media "CNN" can be re-activated so the user 205 can access the "CNN" website upon leaving the second location and/or returning to the first location. According to one or more embodiments, the re-activation can be performed when the user 205 is travelling to a third location from the second location, instead of returning to the first location from the second location. In this scenario, the detection that the electronic device 100 is leaving the second location and/or arriving at the third location can be a trigger for the re-activation operations to be performed. According to one or more embodiments, the information included in the electronic calendar 405 and/or the travel itinerary 410 can be used as a trigger that the user 205 is leaving the second location. The method 900 ends upon completion of the operations of block 915.

According to one or more embodiments, one or more of methods 500/600/700/800/900 further include analyzing one or more of calendar data 128 and travel itinerary data 129 to determine when the user will be travelling with the electronic device from the first location to the second location. One or more of methods 500/600/700/800/900 further include, in response to determining that the user will be travelling to the second location, determining whether the user had previously travelled with the electronic device to the second location. In response to the user having previously travelled with the electronic device to the second location, the method includes determining whether a previous second set of location specific requirements associated with the user's previous travel to the second location is available. And, the method includes, in response to the previous second set of location specific requirements being available: (i) retrieving the previous set of location specific requirements; (ii) performing updates to the previous second set of location specific requirements to account for changes since the user's previous travel to the second location; and (iii) applying device features associated with the updated, previous second set of location specific requirements to the electronic device to enable the electronic device to support the user during an upcoming travel to the second location.

In one or more of methods 500/600/700/800/900, the one or more device features include at least one operational feature or application that is utilized by the user during the travel to the second location, and the at least one processor activates the one or more device features prior to a start of travel to the second location to enable the user to utilize the one or more device features while travelling to the second location. An example of these features can include an in-flight application, such as an entertainment app, that is only available for download prior to initiating the flight.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

a memory; and at least one processor communicatively coupled to the memory and which configures the at least one processor to:

determine, by analyzing at least one of calendaring data and itinerary data, that a user of the electronic device will be travelling from a first location having a first set of location specific requirements to a second location having a second set of location specific requirements, the at least one of calendaring data and itinerary data used to determine the second location and a date and a time the electronic device will be at the second location;

identify the second set of location specific requirements corresponding to the second location, the second set of location specific requirements being at least partially different from the first set of location specific requirements;

in response to a first time trigger corresponding to the date and the time the electronic device is in the second location:

autonomously modify one or more device features corresponding to the second set of location specific requirements to enable the electronic device to operate according to the second set of location specific requirements while the electronic device is in the second location.

2. The electronic device of claim 1, wherein the at least one processor autonomously modifies the one or more device features corresponding to the second set of location specific requirements by activating and/or deactivating one or more device features corresponding to the second set of location specific requirements, and wherein the deactivating includes deactivating one or more device features associated with the first set of location specific requirements that are indicated as expressly excluded from within the second set of location specific requirements.

3. The device of claim 2, wherein the at least one processor:

in response to one of a second time trigger or a second location trigger corresponding to the device leaving the second location, deactivates the one or more device features associated with the second set of location specific requirements; and in response to one of the second time trigger or a third location trigger corresponding to the electronic device returning to a location at which the first set of location specific requirements are supported, autonomously reactivates the one or more device features associated with the first set of location specific requirements that were deactivated.

4. The electronic device of claim 2, wherein the at least one processor:

in response to deactivating the one or more device features associated with the first set of location specific requirements that are indicated as excluded from within the second set of location specific requirements, identifies one or more alternative device features that provide similar functionalities as the one or more device features that are excluded from within the second set of location specific requirements; and associates the one or more alternative device features with the second set of location specific requirements.

5. The electronic device of claim 1, wherein the at least one processor:

identifies one or more device features associated with the first set of location specific requirements that are reconfigurable to be included as one or more device features associated with the second set of location specific requirements;

reconfigures the one or more device features associated with the first set of location specific requirements that are identified as reconfigurable; and associates the one or more reconfigured device features with the second set of location specific requirements.

6. The electronic device of claim 5, wherein the at least one processor:

identifies one or more device features associated with the first set of location specific requirements that are not reconfigurable and are to be excluded as device features associated with the second set of location specific requirements;

identifies one or more alternative device features that are to be included as device features associated with the second set of location specific requirements and which provide similar functionalities as the one or more device features that are not reconfigurable and are to be excluded; and associates the one or more alternative device features with the second set of location specific requirements.

7. The electronic device of claim 1, wherein the at least one processor:

identifies one or more device features not associated with the first set of location specific requirements and are necessary to use the electronic device in the second location; and retrieves and associates, with the second set of location specific requirements, the identified one or more device features that are not associated with the first set of location specific requirements.

8. The electronic device of claim 1, wherein the at least one processor:

in response to determining that the user will be travelling to the second location, determines whether the user had previously travelled with the electronic device to the second location;

in response to the user having previously travelled with the electronic device to the second location, determines whether a previous second set of location specific requirements associated with the user's previous travel to the second location is available; and in response to the previous second set of location specific requirements being available:

retrieves the previous set of location specific requirements;

performs updates to the previous second set of location specific requirements to account for changes since the user's previous travel to the second location; and applies device features associated with the updated, previous second set of location specific requirements to the electronic device to enable the electronic device to support the user during an upcoming travel to the second location.

9. The electronic device of claim 8, wherein to perform updates, the at least one processor:

in response to determining that the second set of location specific requirements associated with the user's previous travel to the second location is available, determines whether the second set of location specific requirements is up-to-date; and in response to the second set of location specific requirements not being up-to-date, update one or more the device features of the second set of location specific requirements to enable the user to use the electronic device with an updated configuration when the user is in the second location.

10. The electronic device of claim 1, wherein the at least one processor activates one or more device features associated with the second set of location specific requirements prior to the user travelling with the electronic device from the first location to the second location to enable configuration of the electronic device to comply with local requirements for operating the electronic device prior to post-travel operation of the electronic device in the second location.

11. The electronic device of claim 10, wherein:

the one or more device features comprise at least one operational feature or application that is utilized by the user during the travel to the second location; and the at least one processor activates the one or more device features prior to a start of travel to the second location to enable the user to utilize the one or more device features while travelling to the second location.

12. A method comprising:

determining, by analyzing at least one of calendaring data and itinerary data, that a user of an electronic device will be travelling from a first location having a first set of location specific requirements for operating the electronic device to a second location having a second set of location specific requirements that are different from the first set, the at least one of calendaring data and itinerary data used to determine the second location and a date and a time the electronic device will be at the second location;

identifying the second set of location specific requirements corresponding to the second location; and in response to a first time trigger corresponding to the date and the time the electronic device is in the second location, autonomously modifying one or more device features corresponding to the second set of location specific requirements to enable the electronic device to operate according to the second set of location specific requirements while the electronic device is in the second location.

13. The method of claim 12, wherein the at least one processor autonomously modifies the one or more device features corresponding to the second set of location specific requirements by activating and/or deactivating one or more device features corresponding to the second set of location specific requirements, and wherein the deactivating includes deactivating one or more device features associated with the first set of location specific requirements that are indicated as expressly excluded from within the second set of location specific requirements.

14. The method of claim 13, further comprising:

in response to one of a second time trigger or a second location trigger corresponding to the device leaving the second location, deactivating the one or more device features associated with the second set of location specific requirements; and in response to one of the second time trigger or a third location trigger corresponding to the electronic device returning to a location at which the first set of location specific requirements are supported, autonomously re-activating the one or more device features associated with the first set of location specific requirements that were deactivated.

15. The method of claim 13, further comprising:

in response to deactivating the one or more device features associated with the first set of location specific requirements that are indicated as excluded from within the second set of location specific requirements, identifying one or more alternative device features that provide similar functionalities as the one or more device features that are excluded from within the second set of location specific requirements; and associating the one or more alternative device features with the second set of location specific requirements.

16. The method of claim 12, further comprising:

identifying one or more device features associated with the first set of location specific requirements that are reconfigurable to be included as one or more device features associated with the second set of location specific requirements;

reconfiguring the one or more device features associated with the first set of location specific requirements that are identified as reconfigurable; and associating the one or more reconfigured device features with the second set of location specific requirements.

17. The method of claim 16, further comprising:

identifying one or more device features associated with the first set of location specific requirements that are not reconfigurable and are to be excluded as device features associated with the second set of location specific requirements;

identifying one or more alternative device features that are to be included as device features associated with the second set of location specific requirements and which provide similar functionalities as the one or more device features that are not reconfigurable and are to be excluded; and associating the one or more alternative device features with the second set of location specific requirements.

18. A computer program product comprising:

a computer readable storage device; and program code on the computer readable storage device that when executed by a processor associated with an electronic device, the program code enables the electronic device to provide functionality of:

determining, by analyzing at least one of calendaring data and itinerary data, that a user of an electronic device will be travelling from a first location having a first set of location specific requirements for operating the electronic device to a second location having a second set of location specific requirements that are different from the first set, the at least one of calendaring data and itinerary data used to determine the second location and a date and a time the electronic device will be at the second location;

identifying the second set of location specific requirements corresponding to the second location; and in response to a first time trigger corresponding to the date and the time the electronic device is in the second location, autonomously modifying one or more device features associated with the second set of location specific requirements to enable the electronic device to operate according to the second set of location specific requirements while the electronic device is in the second location.

19. The computer program product of claim 18, wherein the program code that enables the electronic device to provide the functionality of autonomously modifying the one or more device features corresponding to the second set of location specific requirements includes program code that enables the electronic device to provide the functionality of activating and/or deactivating one or more device features corresponding to the second set of location specific requirements, and wherein the deactivating includes deactivating one or more device features associated with the first set of location specific requirements that are indicated as expressly excluded from within the second set of location specific requirements.

* * * * *